United States Patent [19]
Callas

[11] Patent Number: 4,756,354
[45] Date of Patent: Jul. 12, 1988

[54] APPARATUS FOR COLLAPSING THE BEADS OF ALL-TERRAIN VEHICLE TIRES

[76] Inventor: Frank J. Callas, 4700 Milam, Amarillo, Tex. 79110

[21] Appl. No.: 910,465

[22] Filed: Sep. 23, 1986

[51] Int. Cl.$^4$ .............................................. B60C 25/02
[52] U.S. Cl. ................................... 157/1.3; 157/1.17; 157/1.26
[58] Field of Search .................. 157/1.1, 1.17, 1.3, 157/1.26, 1.28

[56] References Cited

U.S. PATENT DOCUMENTS

| | | | |
|---|---|---|---|
| 2,602,494 | 7/1952 | Larson | 157/1.17 |
| 2,672,185 | 3/1954 | Bergeron | 157/1.26 |
| 3,106,196 | 12/1964 | Ohlsen et al. | 157/1.17 |
| 4,121,644 | 10/1978 | Boyle et al. | 157/1.17 |
| 4,524,813 | 6/1985 | Gering | 157/1.17 |

*Primary Examiner*—Debra S. Meislin
*Attorney, Agent, or Firm*—Norman B. Rainer

[57] ABSTRACT

An apparatus used as an aid in the removal of tires from wheels of all-terrain vehicles (ATV'S) functioning as a "bead-breaker" by collapsing the tire bead from the wheel flange and forcing the bead toward the center of the wheel rim preliminary to actual removal of the tire from the wheel by use of conventional tire tools. All-Terrain vehicles using either three or four wheels may use wheels of various diameter and tires of various widths, requiring the apparatus to be adjustable to service the several wheel sizes. The apparatus consists of steel, plastic, and/or aluminum components of dimensions, weights, and sizes that are assembled into a portable device for use at home, shop, or in the field as needed. The assembled components permits convenient collapsing of the tire bead with minimum effort by the operator.

1 Claim, 1 Drawing Sheet

U.S. Patent Jul. 12, 1988 4,756,354
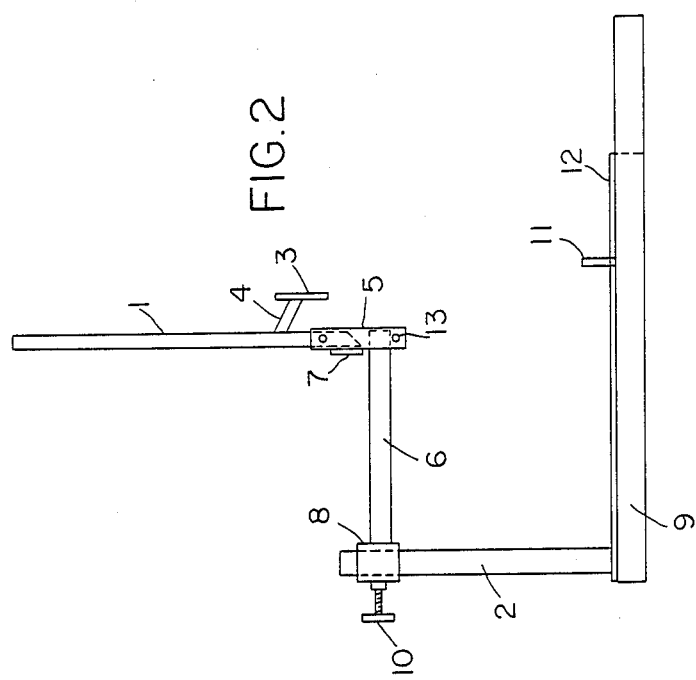
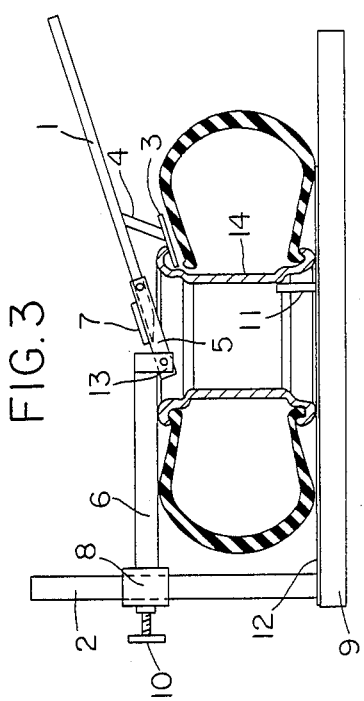
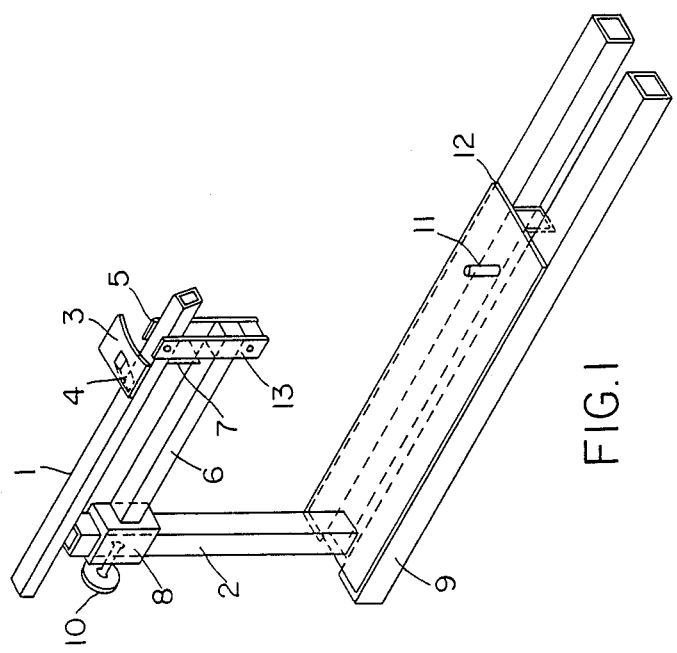

APPARATUS FOR COLLAPSING THE BEADS OF ALL-TERRAIN VEHICLE TIRES

BACKGROUND OF THE INVENTION

1. Field of the Invention:

The present invention generally relates to devices now used in procedures culminating in the removal of deflated tires, either by power or hand operation, from vehicles of all types and sizes. This invention also relates to a specific arrangement of components that makes the apparatus portable and minimizes the efforts of the operator in the collapsing of the tire beads of heavy traction tires as used on ATV's, sometimes called "Dune Buggies".

2. Description of Prior Art:

The need for a portable device suitable for collapsing the beads of heavy traction tires of various sizes has long been existant. The hand operated tire tools in common use, while portable, are difficult to use on ATV tires by inexperienced operators. While such previously known devices have been successful to a degree, such known devices have not been fully acceptable for the specific services rendered by the present invention.

SUMMARY OF THE INVENTION

An object of the invention is to provide an apparatus to facilitate the removal of tires of various sizes from wheels of All-Terrain vehicles (ATV's) commonly called "Dune Buggies" by effecting the collapsing of the tire bead from the wheel flange so that common tire tools may be used to effect the complete removal from the wheel.

Still another object of the invention is to provide an apparatus that aids the removal of ATV tires, and that is readily portable to a site where needed.

Yet another object of the invention is to provide a means of compressing a tire sidewall with sufficient force to collapse the tire bead from the wheel flange with minimum effort applied by the operator.

Again, another object of the invention is to provide a means of applying amplifyed pressure to the tire bead by leverage linkage of unique and novel design.

Still another object of invention is to provide an apparatus capable of accepting wheels and tires of various diameters to permit servicing vehicles of various types, models, and sizes.

These, together with other objects and advantages, which will become subsequently apparent, reside in the details of construction and operation as more fully hereinafter described and claimed, reference being had to the accompanying drawings forming a part here of, wherein like numerals refer to like parts throughout.

BRIEF DESCRIPTION OF DRAWINGS

FIG. 1 is a perspective biew of the assembled apparatus comprising the invention.

FIG. 2 is an elevation view of the apparatus comprising the invention with the compression handle rotated to a vertical position.

FIG. 3 is an elevation view of the apparatus comprising the invention together with a cross section view of a typical ATV tire mounted on the base of the apparatus in readiness for bead compression.

DESCRIPTION OF THE PREFERRED EMBODIMENTS

Referring now specifically to the drawings, the assembled apparatus used for "breaking" compressing and loosening the ATV tire bead from its wheel flange is shown in FIG. 1 with the compression handle, 1, folded over post, 2, for storage or portability. FIG. 1 also shows the compression foot plate, 3, located on the handle, 1, by support 4. Also, FIG. 1, shows the linkage, 5, securing the handle, 1, to the extension arm 6, with locking plate 7, spanning and welded to linkage plates, 5. Also shown on FIG. 1 is a collar 8, attached to arm 6, and sized for a slip-fit over post 2, to provide adjustable heights of arm, 6, above base, 9, and secured at selected height by set screw, 10. Also FIG. 1 shows a vertical post, 11, welded to base 9 to serve as a stop when positioning the wheel on base 9. Finally, FIG. 1 shows a plate of plastic, 12, partially covering the metal base, 9, to provide a slip surface to facilitate the positioning of ATV wheels without marring the finish of the ATV wheels. FIG. 2 is a vertical view of the apparatus comprising the invention with compression handle, 1, and compression foot plate, 3, lifted to a vertical position with the short end of the handle 1, contacting plate, 7, to transmit the compression force to the linkage fulcrum 13, and to compression foot plate, 3. FIG. 3 shows a cross section of a typical ATV tire in place on base 9, and arm 6, lowered on post, 2, to a position at which arm, 6, contacts the surface of the ATV tire, with arm, 6, being secured at its position by set screw, 10. Also the inner surface of the ATV wheel, 14 is shown positioned against stop, 11, to prevent horizontal slippage of the wheel on the plastic surface, 12, when compression foot, 3, forces the tire bead from the wheel flange.

The foregoing is considered illustrative only of the principles of the invention. Further, since the numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. Apparatus for displacing the bead of a deflated tire away from the flange of a wheel upon which said tire is mounted, said apparatus comprising:
   (a) an elongated base adapted to rest upon a substantially flat horizontal surface, and having upraised wheel positioning means,
   (b) an upwardly directed straight post perpendicularly emergent from said base,
   (c) a collar slidably disposed upon said post, and locking means interactive between said post and collar to releasibly immobilize said collar with respect to said post.
   (d) an extension arm attached to said collar and extending to a terminal extremity disposed above said base,
   (e) a fulcrum member attached to said terminal extremity and downwardly extended toward said base,
   (f) paired linkage plates having opposed front and rear elongated parallel straight edges extending between first and second extremities, said plates being pivotably attached adjacent their first extremities to said fulcrum member in a manner to enable said plates to move in spaced apart vertical planes, and a locking plate which spans said linkage plates in joinder with said rear edges, (g) a straight handle elongated between free and secured extremities, and pivotably connected adjacent its secured extremity to said linkage plates adjacent the second extremities thereof, said connection disposing said handle between said linkage plates in a manner permitting movement in a vertical plane between a storage position wherein the free extremity is directed toward said post and a deployed position wherein the free extremity is directed away from said post, causing a surface of the handle to be facing the base, and (h) a foot plate attached to said facing surface of the handle at a site adjacent said secured extremity, whereby (i) when a wheel is positioned upon said base and the free extremity of said handle is swung to its deployed position, said handle abuts against said locking plate to provide a lever pivoted at said fulcrum member, and downward force applied to said free extremity causes the foot plate to be forcibly pressed in an arcuate path against said bead with attendant direction of a component of said force toward the center of the wheel.

* * * * *